3,380,819
**METHOD FOR REMOVING ARSENIC
FROM IRON ORES**
Patrick Edgar Cavanagh, Westmount, Montreal, Quebec,
Canada, assignor to Premium Iron Ores Limited
Filed Jan. 28, 1966, Ser. No. 523,716
9 Claims. (Cl. 75—6)

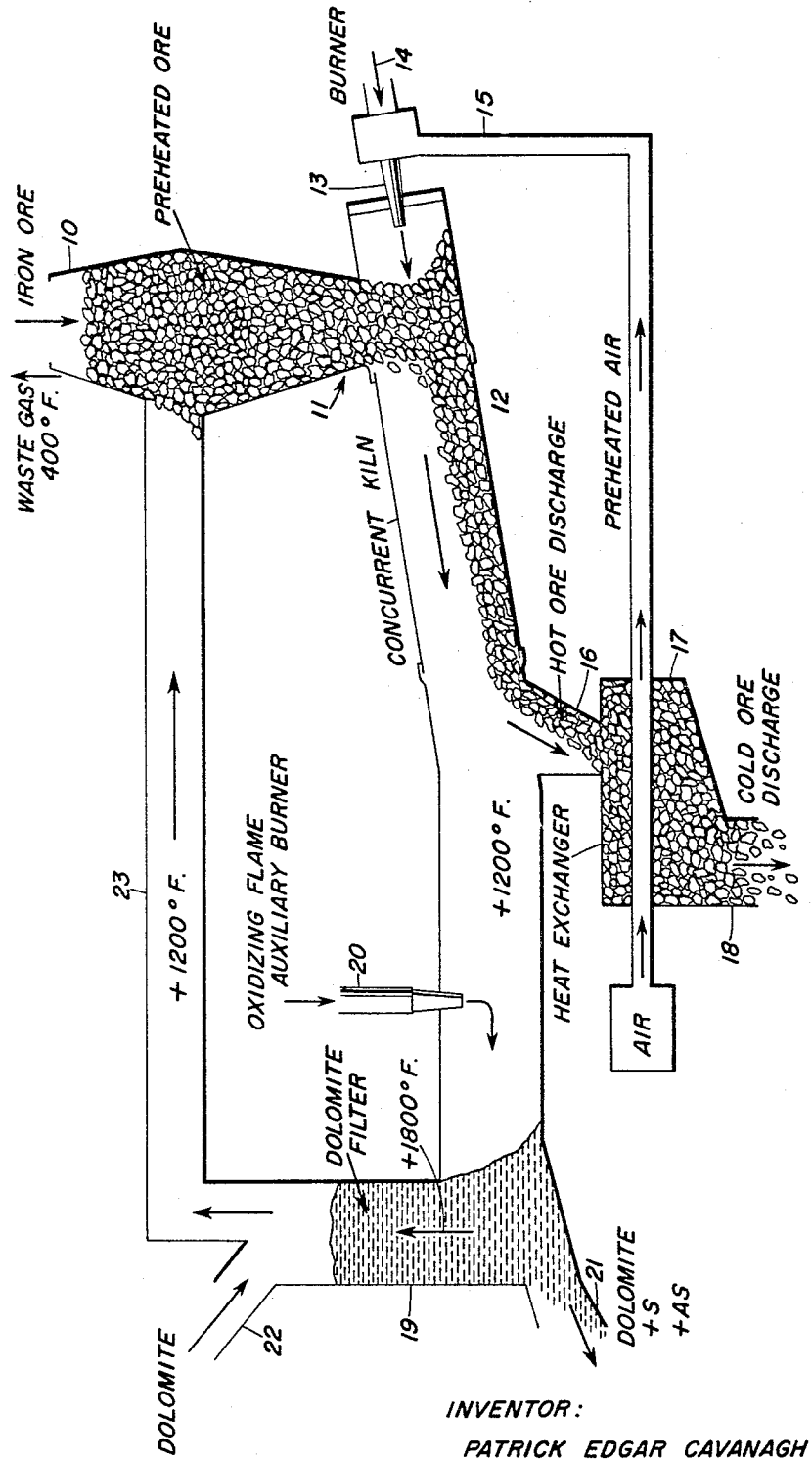

This invention relates to a method of removing arsenic from mineral ores containing minerals normally forming arsenates with the arsenic content thereof upon heating.

Certain gangue minerals capable of forming arsenates such as magnesium and calcium compounds readily combine to form arsenates with arsenic within an ore upon heating of the ore in air. Accordingly it is usual to roast such ores at temperatures adapted to break down these arsenates, that is at high temperatures of the order of more than 2200° F. The elimination of arsenic in large volume roasting of certain Swedish ores and certain ores of North America such as Steep Rock iron ore is both costly and difficult at such high temperatures and must be continued for a substantial period of time that is for two or more hours in some instances to obtain a satisfactory removal of arsenic greater than about 75%.

It is an object of this invention to provide a method of removing of the order of about 85% of arsenic from a mineral ore containing minerals having an affinity for forming arsenates with arsenic oxide.

It is a further object of the invention to provide a method of removing arsenic from mineral ores or the like having gangue minerals therein normally forming arsenates on heating by providing a non-oxiding atmosphere for arsenic at temperatures less than normal roasting temperatures.

It is a still further object of the invention to provide a method of removing arsenic from ores containing minerals normally forming arsenates by volatilizing the arsenic at temperatures between about 1500° and about 1700° F.

Other objects of the invention will be apparent from a study of the following specification taken in conjunction with the accompanying drawings.

In the drawings is shown a diagrammatic outline of apparatus adapted for operation according to the method of the invention.

The test work done over the past few years on removal of arsenic from Steep Rock ores by heating in air has demonstrated conclusively that arsenic is not removed to a significant degree in a reasonable time unless the ore is heated to a temperature of at least about 2200° F. and for more than two hours.

This seems peculiar since most of the arsenides sulfarsenides are arsenopyrites lose arsenic well below this temperature. The temperature at which a reasonable rate of arsenic elimination occurs from such compounds is about 1250° to 1800° F.

The only arsenic compounds with a higher temperature of decomposition are the arsenates. In particular Adelite (MgOH)CaAsO₄ a calcium magnesium arsenate breaks down at over 2200° F. This mineral is uncommon but is associated with manganese ores in Sweden. A similar mineral Telasite contains some fluorine and occurs in iron manganese ores in Sweden. Other arsenates are known which in general have much higher decomposition temperatures than arsenides.

In order to confirm the premise of this invention a series of tests were run. The basic premise was that if arsenic was driven off at a low temperature in a neutral or reducing atmosphere it would not be able to combine with gangue minerals capable of forming arsenates such as lime and magnesia and should therefore leave the ore as arsenic or arsine. As a neutral atmosphere steam was used. As gaseous reducing atmosphere carbon monoxide hydrogen and SO₂ were used. As solid reductant carbon and iron pyrites were used.

The results showed that with the atmosphere and conditions used no arsenic elimination was obtained at 1000° F. At a temperature of 1800° F. over one hour arsenic content was reduced to 0.011% in the presence of carbon monoxide, hydrogen and solid carbon. The use of sulphur dioxide and steam were not satisfactory for arsenic removal under these conditions.

The combination of pyrite and steam gave excellent results with final arsenic of 0.006%. Further test work proceeded at temperatures intermediate between 1000° and 1800° F. It was discovered by this invention that arsenic was successfully removed at temperatures below 2200° F. only by preventing the arsenic from being oxidized before leaving the furnace.

Both sulphur and arsenic would be present in objectionable quantities in the exhaust gases of a calcining or pelletizing unit using this technique. The most satisfactory method for overcoming this difficulty is to have a dolomite filter in the gas flue. Dolomite is more satisfactory than limestone in combining chemically at high temperatures to form sulphates and arsenates. An oxidizing zone may be established ahead of the dolomite filter to oxidize sulphur and arsenic to oxides before contacting the hot dolomite.

A process of the present invention permits lower temperature treatment of certain iron ores such as Steep Rock ores to produce a calcined product low in sulphur and arsenic similar to that obtained by pelletizing, and to some sinter strand operators such a calcined product may be more attractive than pellets. The same high sulphur and off-grade types of ore that can be disposed of through pelletizing can also be just as satisfactory chemically when up-graded by calcining according to the invention.

The required conditions in a rotary kiln are that the temperatures be more than 1500° F. for one hour or longer and that the oxygen content of the kiln gas atmosphere be a minimum of 1% and a maximum of 6%. The preferred oxygen level is 3%. At oxygen levels higher than 6% arsenic is oxidized and combined with the ore constituents to form high temperature arsenate compounds.

TABLE 1

| Test | Kiln Temperature, Degrees F. | Steep Rock Ore Analysis, Percent | | Percent Arsenic Removal |
|---|---|---|---|---|
| | | Sulphur | Arsenic | |
| 1 | 1,080 | .052 | .030 | 0 |
| 2 | 1,534 | .052 | .030 | 0 |
| 3 | 1,892 | .052 | .030 | 38 |
| 4 | 1,986 | .052 | .030 | 64 |
| 5 | 2,040 | .052 | .030 | 71 |

Table 1 demonstrates that in an oxidizing atmosphere for arsenic a temperature of over 2000° F. for one hour is required to achieve even 71% arsenic removal.

TABLE 2

| Test | Blended Steep Rock Ore Analysis, Percent | | Additions | Percent Arsenic Removal |
|---|---|---|---|---|
| | Sulphur | Arsenic | | |
| 1 | 0.032 | 0.030 | | 0 |
| 2 | 0.052 | 0.030 | | 0 |
| 3 | 1.500 | 0.030 | | 41 |
| 4 | 1.000 | 0.030 | 3% Lignite | 70 |
| 5 | 0.020 | 0.030 | 5.4% Lignite | 80 |

Table 2 shows the effect of reducing the oxygen content of the atmosphere in contact with an arsenic bearing ore of this type in improving the removal of arsenic at relatively low temperatures by heating for one hour at 1600° F.

If sulphur is added to the ore by mixing in high sulphur portions of the ore body then the kiln atmosphere will be depleted of oxygen to form $SO_2$. The result of increasing sulphur content is shown in Tests 1, 2 and 3 in Table 2. In Test 3 the sulphur content is sufficiently high so that the residual oxygen in the kiln atmosphere is low enough to allow removal of arsenic.

The oxygen level in the atmosphere can be controlled by several different methods. Among the commercial practical methods are included the addition of materials which are more easily oxidized than arsenic such as carbon in such forms as lignite and coke and hydrocarbons such as oil, natural gas and similar compounds. Alternatively the oxygen content can be controlled at the desired level by addition of dilutants such as nitrogen, steam or other inert gases.

Test 3 of Table 2 demonstrates the beneficial result of high sulphur and Tests 4–5 show the result of high carbon as an addition.

TABLE 3.—STEEP ROCK ORE ANALYSIS

| | | |
|---|---|---|
| Temperature | ° F | 1700 |
| Sulphur | percent | 1.00–2.00 |
| Arsenic | do | 0.034 |
| Lignite addition | do | 6 |
| Arsenic elimination | do | >85 |

Table 3 shows the result of commercial scale tests in a large rotary kiln which gives very satisfactory arsenic elimination at reasonable cost in one hour.

Referring to the drawing a preferred apparatus is shown in schematic and is diagrammatic of actual apparatus utilize in a pilot operation for handling Steep Rock ore. While it should be understood that the method of the present invention may be applied to various types of processes, either batch or continuous flow types, the invention is shown applied to a particular operation by way of example.

The ore feed through hopper 1 is led to the end 11 of the concurrent kiln 12, the ore in this case made by way of example contained as much as .03% arsenic and either 6% lignite or 10% pyrite, the latter containing substantial sulphur. The kiln is heated and the atmosphere controlled therein by means of the burner 13 supplied with the fuel 14 and the preheated air 15.

The calcined ore is fed out through the hot ore discharge 16 and through the heat exchanger 17 which provides the necessary heat for the preheated air supply 15. The cold ore discharge is shown at 18.

In the region of the exit of the hot ore as at 16 the temperature is in the order of 1200 degrees F. and above. The kiln is preferably operated at about 1500–1700 degrees F. in a range of 1–6% oxygen.

Gases containing the arsenic are forced through the dolomite filter as at 19, the auxiliary burner 20 providing additional heat and oxidizing arsenic and sulphur in the gas to oxides which will combine chemically with calcium annd magnesium in the hot dolomite to form arsenates and sulphates at dolomite temperatures over 1800° F. as required to effect the removal of arsenic from the gases by means of the dolomite. In addition, sulphur is removed by the filter stack and the waste dolomite is removed as at 21, additional dolomite being supplied through the hopper 22. Filtered gasses pass by means of the pipe 23 into the charging hopper 10, thereby to preheat the ore passing therethrough ready for entry into the kiln 12.

The method herein is intended for the removal of arsenic from ores containing gangue minerals which would combine with arsenic oxides to form arsenates. To avoid this undesirable effect it has been found that controlling the oxygen content of the atmosphere in contact with the ore at a temperature between 1500° F. and 1700° F. to a level of 3% oxygen will allow the removal of 85% or more of the arsenic in about one hour.

Investigations of the method herein have led to the belief that arsenic occurring in an ore containing gangue minerals capable of forming arsenates such as magnesium, and calcium compounds will form arsenates with such compounds upon roasting in air due to the oxidizing of the arsenic to arsenic trioxide. The arsenates in turn are most difficult to eliminate by roasting except at very high temperatures and for prolonged periods of time.

By the invention an atmosphere low in oxygen may be accomplished preferably by the introduction of carbon or carbon containing minerals such as lignite to effect the formation of carbon dioxide thus utilizing substantial oxygen and controlling the oxygen atmosphere to a level less than about 6%. The investigation of the transition of arsenic oxydic compounds and their presence as suboxides, trioxides and pentoxides involves a subject not fully reported in the technical literature and therefore difficult to report and correlate as a result of many tests made by way of gas measurements and gas analysis. Sufficient therefore is the recording of the examples of process methods which do work and the manner in which the same may be controlled as set forth herein to obtain the results reported herein according to the method as set forth in the following claims.

It is intended that this disclosure should not be construed in any limiting sense other than that indicated by the scope of the following claims having regard to the state of the art in reference to the problem of removing arsenic from the ores of interest to the invention.

What I claim is:

1. A low temperature method for removing most of the arsenic from ores containing arsenic and minerals normally forming arsenates therewith on heating to roasting temperatures and comprising: heating said ore in an atmosphere containing between about 1% and about 6% oxygen and at a temperature between about 1500° F. and about 1700° F. for about one hour to form gaseous arsenic.

2. A low temperature method for removing most of the arsenic from ores containing arsenic and minerals normally forming arsenates therewith on heating to roasting temperatures as claimed in claim 1, in which said gaseous arsenic is separated from the heated ore and collected in an oxidizing zone.

3. A method as claimed in claim 2, including the step of adding carbon to said ore to control said oxygen content of said atmosphere.

4. A low temperature method for removing most of the arsenic from ores containing arsenic and minerals normally forming arsenates therewith on heating to roasting temperatures as claimed in claim 3, including the step of reacting said collector gaseous arsenic with calcium and magnesium oxides at high temperature to form arsenates.

5. A method as claimed in claim 3, in which the ore also contains sulphur which forms gaseous sulphur upon said heating and comprising the further steps of separating the gaseous sulphur and gaseous arsenic from the heated ore and collecting said gaseous sulphur and gaseous arsenic.

6. A method as claimed in claim 2, including the step of adding sulphur to said ore to control said oxygen content.

7. A method as claimed in claim 5, including the step of reacting said collected gaseous arsenic and gaseous sulphur with calcium and magnesium oxides to form arsenates and sulfates.

8. The method according to claim 2, in which the ore also naturally contains sulphur in an amount sufficient to control the oxygen content of the atmosphere during roasting.

9. The method according to claim 2, in which the ore naturally contains an amount of sulphur insufficient to control the oxygen content of the atmosphere during roasting and in which additional sulphur is introduced in amounts sufficient only to control the oxygen content of said atmosphere during said roasting.

No references cited.

BENJAMIN HENKIN, *Primary Examiner.*